No Printed Specification Available
S. L. Faries,
Muzzle Loader.
5210x
No.
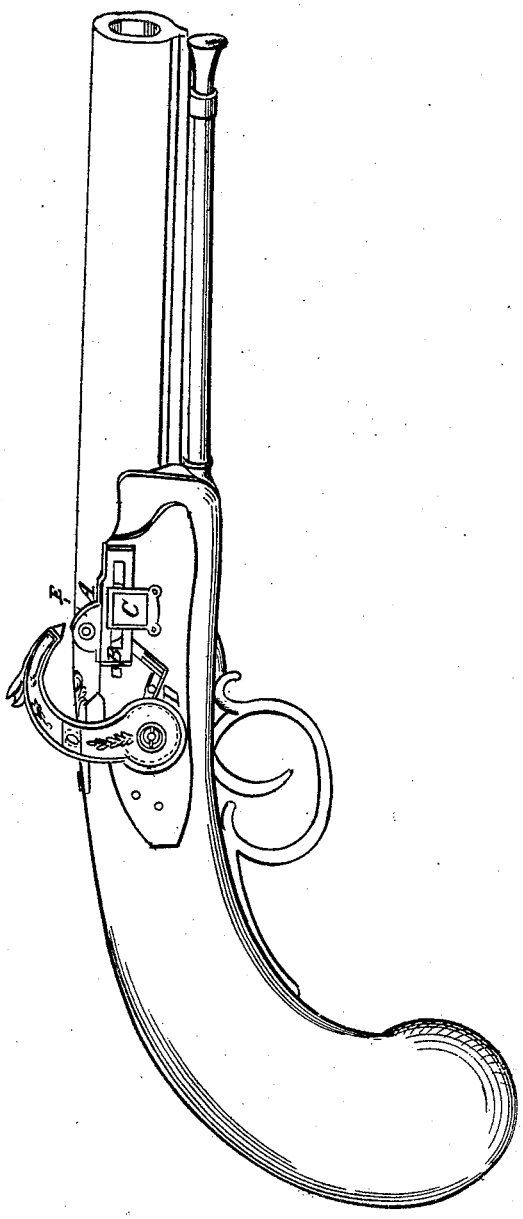
Patented Aug. 29. 1828